United States Patent
Glover et al.

(10) Patent No.: US 9,868,118 B2
(45) Date of Patent: Jan. 16, 2018

(54) PROCESS FOR REGENERATING CATALYST PARTICLES

(71) Applicant: UOP LLC, Des Plaines, IL (US)

(72) Inventors: Bryan K. Glover, Algonquin, IL (US); Mohamed S. Shakur, Hoffman Estates, IL (US)

(73) Assignee: UOP LLC, Des Plaines, IL (US)

(*) Notice: Subject to any disclaimer, the term of this patent is extended or adjusted under 35 U.S.C. 154(b) by 324 days.

(21) Appl. No.: 14/869,235

(22) Filed: Sep. 29, 2015

(65) Prior Publication Data

US 2016/0175832 A1 Jun. 23, 2016

Related U.S. Application Data

(60) Provisional application No. 62/093,506, filed on Dec. 18, 2014.

(51) Int. Cl.
| | |
|---|---|
| *B01D 53/50* | (2006.01) |
| *B01J 38/42* | (2006.01) |
| *B01J 38/18* | (2006.01) |
| *B01J 38/26* | (2006.01) |
| *B01J 27/32* | (2006.01) |
| *B01J 8/26* | (2006.01) |
| *B01J 38/72* | (2006.01) |

(52) U.S. Cl.
CPC ............. *B01J 38/42* (2013.01); *B01J 8/26* (2013.01); *B01J 27/32* (2013.01); *B01J 38/18* (2013.01); *B01J 38/26* (2013.01); *B01J 38/72* (2013.01)

(58) Field of Classification Search
None
See application file for complete search history.

(56) References Cited

U.S. PATENT DOCUMENTS 6,881,391 B1   4/2005   Sechrist

FOREIGN PATENT DOCUMENTS

WO    WO 9113682 A1 *  9/1991

* cited by examiner

*Primary Examiner* — Anita Nassiri Motlagh

(57) ABSTRACT

A process for regenerating catalyst particles is disclosed. The process includes the steps: (a) withdrawing a regeneration zone effluent comprising halogen from a regeneration zone, wherein the regeneration zone contains catalyst particles comprising halogen; (b) contacting a first portion of the regeneration zone effluent with adsorbent in a first adsorption zone, removing halogen from the first portion of the regeneration zone effluent, and withdrawing from the first adsorption zone a first adsorption zone effluent; (c) contacting the first adsorption zone effluent with a water removing material to create a first water-depleted stream; and (d) passing the first water-depleted stream to the regeneration zone. Other embodiments include different orders of the steps.

12 Claims, 4 Drawing Sheets

PROCESS FOR REGENERATING CATALYST PARTICLES

CROSS-REFERENCE TO RELATED APPLICATION

This application claims priority from Provisional Application No. 62/093,506 filed Dec. 18, 2014, the contents of which are hereby incorporated by reference in its entirety.

The disclosure relates to a process for regenerating catalyst particles wherein a water removing material is used to remove moisture from one or more process streams.

BACKGROUND OF THE INVENTION

Numerous hydrocarbon conversion processes are widely used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others.

Many such processes use catalysts to promote hydrocarbon conversion reactions. These catalysts tend to deactivate for a variety of reasons, including the deposition of coke upon the catalyst, and/or loss of catalytic metal promoters such as halogens. Consequently, these catalysts are typically reactivated in a process called regeneration. Regeneration can include, among other things, removing coke from the catalyst by burning (combustion), and replenishing catalytic promoters such as halogens on the catalyst, and drying the catalyst.

One of the problems during regeneration of halogen-containing catalysts is the loss of halogen from the catalyst. This happens when catalyst particles are contacted with gases that, while regenerating the catalyst particles, tend also to remove halogen from the catalyst particles. Therefore, processes have been developed for returning a halogen to catalyst particles undergoing regeneration. For example, U.S. Pat. No. 6,881,391 discloses a method for regenerating catalyst particles wherein chlorine-containing vent gas from a catalyst regenerator is sent to an adsorption/desorption system to recover the chlorine, and the recovered chlorine is passed back to the catalyst regenerator.

Water can build up in the circulating gas, and if using a catalyst sensitive to moisture, then moisture reduction becomes desirable.

Therefore, what is needed is an improved process for the regeneration of halogen-containing catalysts wherein excess moisture can be removed from the process streams of the catalyst regeneration system.

SUMMARY OF THE INVENTION

The foregoing needs are met by a process for regenerating catalyst particles according to the invention.

It is an advantage of the invention to provide a catalyst regeneration system including a water removing material, such as a membrane, wherein water can be selectively rejected from the regeneration vent gas that leaves the regeneration zone and enters the burn zone. The membrane is very stable in the highly acidic environment and highly selective to reacting with and removing water. The HCl, $Cl_2$ and all other molecules are retained and can be sent to an adsorption/desorption system for recovery of chlorine. The process is improved by sending a dry gas to the adsorption zone. This reduces the build up of moisture in the burn zone of the catalyst regenerator of the regeneration zone. Other water removing materials may be used, and other forms of the materials may be used such as beads.

It is another advantage of the invention to provide a catalyst regeneration system including a water-removing material that dries the reduction gas that is used in the reduction zone of the system. Reducing the moisture in the reduction gas improves the reduction of the catalyst and leads to improved yields.

These and other features, aspects, and advantages of the present invention will become better understood upon consideration of the following detailed description, drawings and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
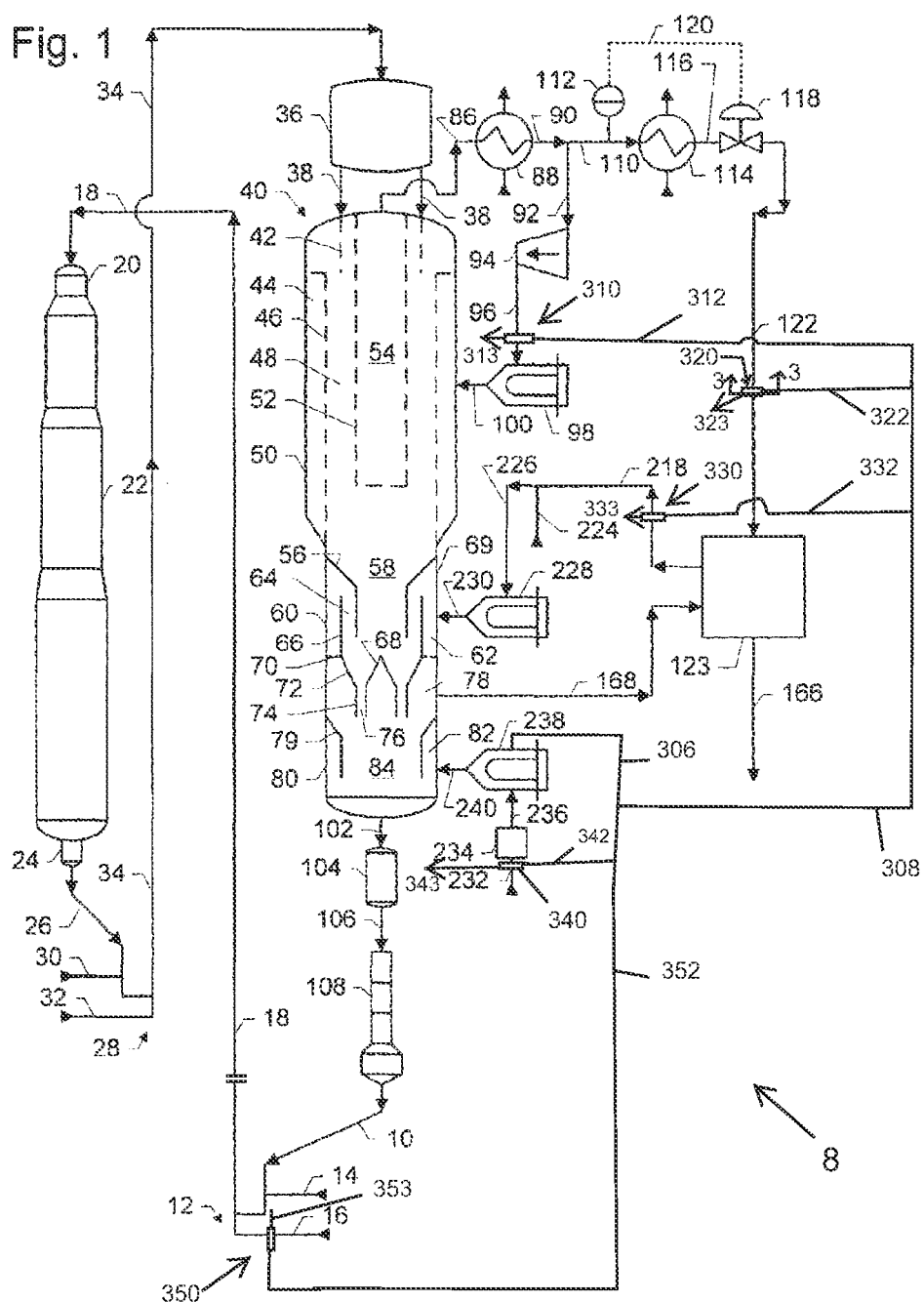
FIG. 1 illustrates a catalyst regeneration system including a stacked arrangement of reactors, a regenerator, and an adsorption zone for removing halogens from the regenerator vent gas and returning these halogens to the regenerator.

FIG. 1 illustrates a catalyst regeneration system 8 including a stacked arrangement of reactors, a regenerator in the regeneration zone, and an adsorption zone for removing halogens from the regenerator vent gas and returning these halogens to the regenerator. It is understood that the adsorption zone may be operated in a desorption mode as well, such as for desorbing adsorbed components. Line 10 supplies catalyst particles to a valve 12. Hydrogen enters valve 12 through line 14 at a rate that regulates the transfer of catalyst particles through valve 12 into line 18. As catalyst particles enter line 18, more hydrogen enters the bottom of line 18 through line 16 and transports the catalyst particles upwardly through line 18 to the top 20 of stacked reactor arrangement 22, which the particles and lift fluid enter.

Catalyst particles flow from the top to the bottom of the stacked reactor arrangement 22. At the top 20, the catalyst particles pass first through a reduction zone, where hydrogen gas reduces the metal on the catalyst particles. From there the catalyst particles pass through multiple reactors where hydrocarbons contact the catalyst particles and coke is deposited on the catalyst particles. The stacked reactor arrangement 22 permits continuous or intermittent flow of the catalyst particles from the top 20 to lower retention chamber 24 at the bottom. Additional hydrogen enters chamber 24 through a line (not shown) at a rate that purges hydrocarbons from the catalyst particles in chamber 24.

Catalyst particles containing coke deposits flow from chamber 24 and through line 26. In line 26, hydrogen and hydrocarbons are displaced from the catalyst particles to prevent any carry-over of hydrogen and hydrocarbons to regenerator 40. At the bottom of line 26, a valve 28 transfers catalyst particles upwardly through line 34. Nitrogen enters valve 28 through line 30 and additional nitrogen enters the bottom of line 34 through line 32.

Catalyst particles pass through line 34 into disengager 36. Nitrogen enters disengager 36 through a line (not shown) at a rate that separates broken or chipped catalyst particles and catalyst fines from the whole catalyst particles. The catalyst chips and fines exit through another line (not shown) for collection. The whole catalyst particles flow from the bottom of disengager 36 through lines 38 to regenerator 40.

Lines 38 discharge catalyst particles into conduits 42 inside regenerator 40. Conduits 42 feed the catalyst particles to annular regeneration zone 48 formed by outer catalyst particle retention screen 46 and inner catalyst particle retention screen 52. Bed 48 is in a coke combustion zone 50. In this embodiment, regenerator 40 is cylindrical in form, as are retention screens 46 and 52, which are concentric with regenerator 40. Screens 46 and 52 are perforated with holes that are large enough to allow gas to pass through bed 48 but do not permit the passage of catalyst particles therethrough. Outer screen 46 extends downward from lines 42 and is supported at its bottom and its top to keep it centered in regenerator 40. Inner screen 52 is attached to the top head of regenerator 40 and extends downward from there to a point slightly above the lower end of the screen 46. The bottom of inner screen 52 is open to allow gas containing oxygen and chlorine to flow upward from cylindrical regeneration zone 58 to central section 54, as will be described hereinafter.

The bottom of bed 48 is open to allow catalyst particles to empty from bed 48 into bed 58. The catalyst particles in bed 58 are located in a chlorination zone 60. Bed 58 is defined in part by annular baffle 56. Catalyst particles flow from bed 58 into the open volume between truncated conical baffle 72 and conical baffle 68, which is concentric with baffle 72. From there, the catalyst particles flow downwardly into an annular holdup zone 76 defined by a lower cylindrical portion 74 of baffle 72 and a lower cylindrical portion of baffle 68. The annular volume of catalyst particles retained between baffles 72 and 68 provides a gas seal to limit the flow of gases upwardly through the catalyst particles into bed 58. Catalyst particles flow from zone 76 into cylindrical regeneration zone 84. The catalyst particles in bed 84 are located in a drying zone 80. Bed 84 is defined in part by annular baffle 79. The catalyst particles are periodically transferred from bed 84 by withdrawing a predetermined volume of catalyst through line 102 which in turn allows the catalyst particles to slump downward through the packed catalyst beds in disengager 36 and in zones 50, 60, and 80.

The catalyst particles exiting regenerator 40 through line 102 pass to nitrogen seal drum 104, through line 106, and to lock hopper arrangement 108. Seal drum 104 and lock hopper arrangement 108 control the transfer of catalyst particles back to stacked reactor arrangement 22. The nitrogen seal drum 104 and lock hopper arrangement 108 also displace oxygen gas from the catalyst particles to prevent any carry-over of oxygen to stacked reactor arrangement 22.

Looking now to the gas flows, recycle gas enters the coke combustion zone 50 through line 100. The recycle gas is distributed in annular chamber 44 that extends around screen 46 and is defined by screen 46 and the vessel wall of regenerator 40. An upper portion of screen 52 is impermeable to gas flow, or blanked off, to prevent gas flow from chamber 44 across the top of the regenerator 40. As the recycle gas passes through regeneration zone 48, oxygen is consumed in the combustion of coke and gas is collected in section 54. The process of combusting coke removes chloride from the catalyst particles, and therefore the gas collected in section 54 contains not only water and carbon dioxide but also chlorine and hydrogen chloride.

The gas that collects in section 54 includes not only gas from bed 48, but also gas containing oxygen, chlorine, and hydrogen chloride flowing upward from bed 58. Because the gas that collects in section 54 includes gas that will be vented from the coke combustion zone 50 as well as gas that will be recycled in the coke combustion zone 50, the gas is usually denoted "vent gas/recycle gas". The vent gas/recycle gas leaves section 54 and passes through line 86. to cooler 88. Cooler 88 uses any suitable cooling medium such as water or air, and removes some of the heat from the vent gas/recycle gas during normal operation. The cooled vent gas/recycle gas flows through line 90 and splits into two portions. One portion is recycled to the coke combustion zone 50 and is called the recycle gas stream. This portion is conveyed by line 92 to blower 94 and then passes through line 96 to heater 98. Heater 98 heats the recycle gas stream to carbon-burning temperatures during start-up and to a lesser degree adds heat to the recycle gas stream during normal operation. Heater 98 operates in conjunction with cooler 88 to regulate the heat content of the recycle gas stream. The recycle gas stream passes through line 100 and enters coke combustion zone 50.

The other remaining portion of the cooled regeneration vent gas stream is called the regeneration vent gas and flows through line 110 to cooler 114. Cooler 114 cools the regeneration vent gas stream by indirect heat exchange with any suitable cooling medium such as water or air. The cooled regeneration vent gas flows through line 116 to pressure regulating valve 118. Pressure indicator-controller 112 measures the pressure in line 110 and generates signal 120. Signal 120 is representative of the difference between the actual pressure and the desired pressure in line 110. Signal 120 regulates the extent of opening of valve 118. The desired pressure in line 110 is set in order to maintain a target pressure in one of the zones of the regenerator 40, usually the coke combustion zone 50. After being cooled and depressured, the regeneration vent gas stream is at the desired gas inlet temperature for adsorption and flows through line 122 to adsorption zone 123.

Figure 2:
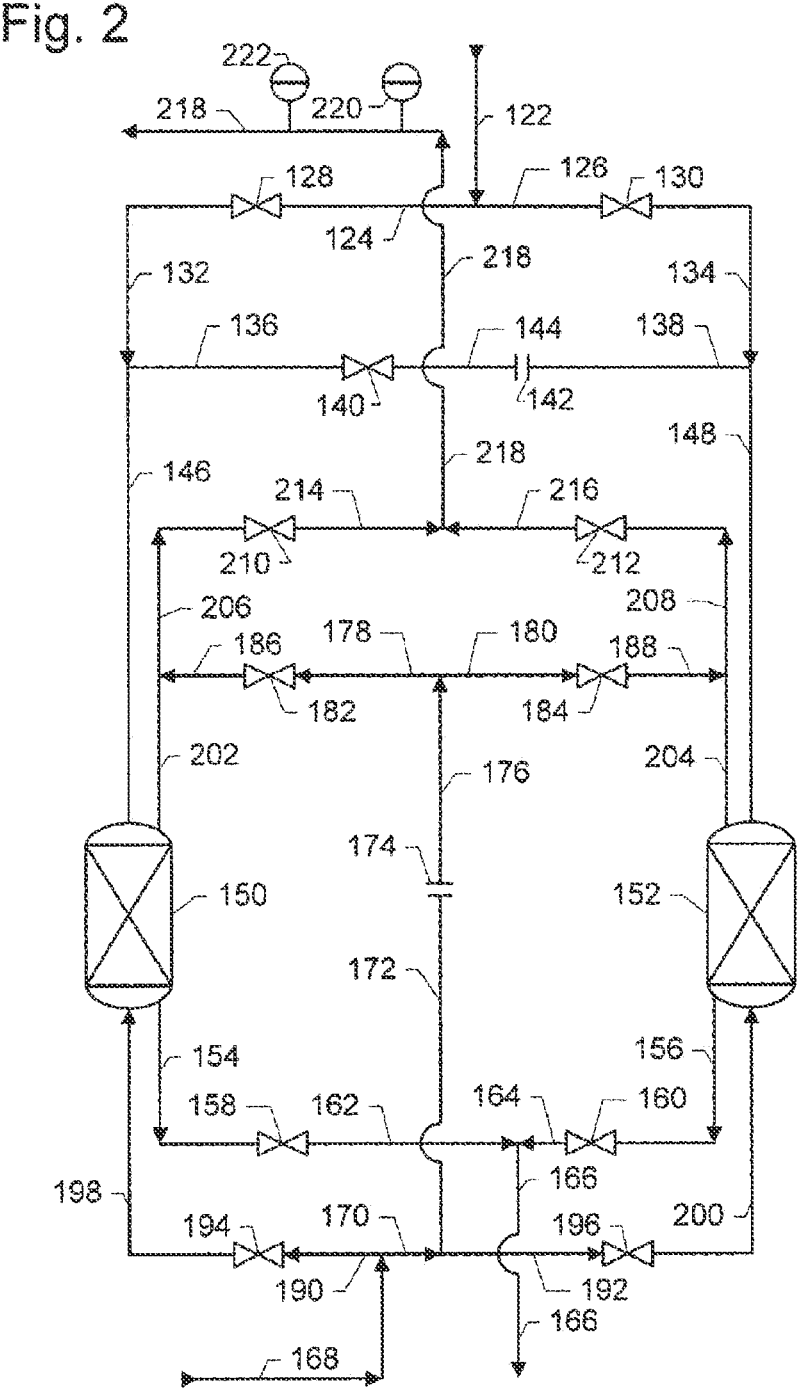
FIG. 2 illustrates the adsorption zone of FIG. 1.

A better understanding of adsorption zone 123 can be obtained from FIG. 2. Zone 123 comprises two beds 150 and 152 and the other lines, the valves, and the other equipment shown in FIG. 2. Beds 150 and 152 contain an adsorbent such as alumina. When bed 150 operates in adsorption mode, bed 152 operates in desorption mode. The regeneration vent gas stream in line 122 flows through line 124, valve 128, line 132, and line 146, and enters bed 150. The adsorbent in bed 150 adsorbs at least some of the chlorine and hydrogen chloride from the vent gas. The adsorption effluent gas flows through line 154, valve 158, and line 162, and the effluent is discharged from zone 123 through line 166. If desired, this effluent can be sent to conventional facilities (not shown) to neutralize any residual chlorine or hydrogen chloride that may be present in the effluent. However, the residual chlorine and hydrogen chloride content is so relatively low that the need for such an additional neutralization step is often eliminated.

Looking at FIG. 1, line 232 supplies makeup air to coke combustion zone 50. This makeup air is introduced, however, initially to drying zone 80, from which most of the oxygen in the makeup air ultimately makes its way to coke combustion zone 50. Air from line 232 is added to regenerator 40 at a rate of addition generally equal to the rate of vent gas in line 110. Air in line 232 is dried in drier 234 and then passes through line 236 to heater 238, which raises the temperature of the air stream to about 566° C. (1050° F.). The heated, dry air stream passes through line 240 to drying zone 80. The air stream enters annular space 82, which is defined by annular baffle 79 and the vessel wall of regenerator 40. Annular baffle 79 is used to uniformly distribute the air through bed 84. Contacting the catalyst in bed 84 with the heated, dry air removes water from the catalyst.

Drying bed effluent gas, which is mostly air now laden with water, exits the top of bed 84. Pressure drop provided by zone 76 forces the majority of the upward flowing gas into annular space 78, which is defined by the vessel wall of regenerator 40, baffles 72 and 74, and partition 70. Most of the water-laden effluent gas flows through line 168 to zone 123 to be used for desorption. Referring to FIG. 2, the gas in line 168 flows through line 170, line 192, valve 196, and line 200, and enters bed 152. The adsorbent in bed 152 contains chloride, which is desorbed and exits as hydrogen chloride and chlorine with the effluent of bed 152. A portion of the gas flowing through line 200 may be made to bypass bed 152 through a bypass line (not shown). Bed 152 effluent flows through line 204, line 208, valve 212, line 216, line 218, and line 226 to heater 228 (see FIG. 1). Heater 228 heats the gas to the desired gas inlet temperature, and the gas flows through line 230 and enters chlorination zone 60. Flow indicator 220 measures the flow rate of the effluent in line 218, and analyzer 222 measures the concentrations of chlorine and hydrogen chloride in the effluent in line 218. These measurements of flow rate and concentrations allow computation of the quantities of chlorine and hydrogen chloride per unit time carried by the bed 152 effluent to chlorination zone 60. If the rate of chlorine or hydrogen chloride is too low for the requirements of the chlorination zone 60, additional chlorine-containing materials such as a chlorinated paraffin can be added to line 218 through line 224.

The gas that contacts the catalyst in bed 58 comprises a mixture of gas flowing through line 230 and gas flowing upward from annular space 78. This mixture is formed in a two-pass baffle system 69 before entering the bottom of bed 58. Partition 70 is a flat plate, which may be solid and impermeable to gas flow or alternatively may define a plurality of restriction orifices that allow gas to flow through partition 70. When present, the restriction orifices are sized to produce a pressure drop for flow passing through partition 70. The pressure drop induces most of the gas flow from space 78 to flow through zone 123 and to enter space 62 via line 230. When the restriction orifices are not present, partition 70 functions as a barrier to gas flow, forcing even more of the gas flow out to zone 123. If needed, a compressor or blower (not shown) can be placed anywhere in line 168, zone 123, line 218, or line 226 to force this gas flow through zone 123. When the restriction orifices are present, the remainder of the gas flow from space 78 enters space 62 through partition 70. If the pressure drop is suitable, the previously mentioned chlorine-containing materials added into line 218 through line 224 may instead be introduced directly into space 62. Space 62 is defined by upper cylindrical portion 66 of baffle 72, partition 70, baffle 56, and the vessel wall of regenerator 40. Cylindrical portion 66 is concentric with annular baffle 56. From space 62 the mixture of gases flows into space 64 defined by cylindrical portion 66 and annular baffle 56. From space 64, the gases enter the bottom of bed 58.

Prior to being placed in adsorption mode, bed 150 operated in desorption mode. While bed 150 was in desorption mode, the chloride on the adsorbent was desorbed and passed to chlorination zone 60 through line 218. This desorption depleted the adsorbent in bed 150 of chloride, and thereby prepared the adsorbent in bed 150 for use in adsorption mode. FIG. 2 provides an understanding of how bed 150 operated in desorption mode. The gas in line 168 flowed through line 190, valve 194, and line 198, and entered bed 150. The adsorbent in bed 150 contained chloride, which was desorbed and exited with the effluent of bed 150. Bed 150 effluent flowed through line 202, line 206, valve 210, and line 214, and into line 218.

Conversely, prior to being placed in desorption mode bed 152 operated in adsorption mode. While bed 152 was in adsorption mode, the chlorine and hydrogen chloride from the vent gas stream were adsorbed on the adsorbent. This adsorption added chloride to the adsorbent in bed 152, and thereby prepared the adsorbent in bed 152 for use in desorption mode. When bed 152 was in adsorption mode, the vent gas stream in line 122 flowed through line 126, valve 130, line 134, and line 148, and entered bed 152. The adsorbent in bed 152 adsorbed some of the chlorine and hydrogen chloride from the vent gas. The adsorption effluent gas flowed through line 156, valve 160, and line 164, before being discharged through line 166.

If the pressure used for removing halogen from the vent gas stream is less than the pressure used for removing halogen from the adsorbent, then a bed that has been used for removing halogen from the vent gas stream should be pressured up to prior to removing halogen from the bed. A convenient gas source for this pressuring step is the gas that is being used for removing halogen from the bed. In the case of pressuring bed 152, valve 184 is opened so that this gas may flow from line 168, through lines 170 and 172, through restriction orifice 174, through lines 176 and 180, through valve 184, through lines 188 and 204, and into bed 152. In the case of pressuring bed 150, valve 182 is opened so that the gas flows from line 168, through lines 170 and 172, through orifice 174, through lines 176 and 178, through valve 182, through lines 186 and 202, and into bed 150. Orifice 174 is sized to set a gas flow rate corresponding to a desired pressuring rate.

After halogen has been removed from an adsorbent bed, and if the pressure used for removing halogen from the vent gas stream is less than the pressure for removing halogen from the adsorbent bed, that adsorbent bed should be depressured prior to being placed in adsorption mode. A convenient destination for the gas released during depressuring is a bed that is being used for adsorption, since the released gas may contain halogen. In the case of depressuring bed 150, valve 140 is opened so that gas flows from bed 150, through lines 146 and 136, through valve 140, through line 144, through restriction orifice 142, through lines 138 and 148, and into bed 152. In the case of depressuring bed 152, valve 140 is opened so that gas flows from bed 152, through lines 148 and 138, through orifice 142, through line 144, through valve 140, through lines 136 and 146, and into bed 150. Orifice 142 is sized to set a gas flow rate corresponding to a desired depressuring rate.

Halogen recovery is generally greater than about 80 wt-% and preferably greater than about 90 wt-%. The vent gas stream that enters the bed being used for adsorption typically contains from 50 to 10000 mol-ppm hydrogen chloride and from 1 to 500 mol-ppm chlorine. The vent gas stream enters cooler 114 at typical catalyst regeneration temperatures of from about 371° C. to about 538° C. (700° F. to 1000° F.). Most of the cooling occurs in cooler 114 but some additional cooling may occur as a result of depressuring the vent gas stream across valve 118. The inlet temperature of the gas entering a bed in adsorption mode is typically at from about 149° C. to about 260° C. (300° F. to 500° F.). If the temperature of the adsorbent in a bed that is placed in adsorption mode is initially different from the inlet temperature of the gas, the adsorbent temperature will rise or fall. Therefore, after some period of contacting the temperature at which adsorption occurs will usually be within the range of from about 149° C. to about 260° C. (300° F. to 500° F.).

The regeneration zone and the adsorption zone may be in immediate proximity to one another, or the regeneration zone and the adsorption zone may be spaced apart from one another. The distance between the regeneration zone and adsorption zone may require conduits to conduct streams between the two zones and the two zones may be spaced apart by a distance of from 20 meters to 1000 meters or more. By the term "spaced apart," it is intended that the adsorption zone be a separate structure from the regeneration zone that is separated from the regeneration zone by a distance, except for connecting lines such as the regeneration vent gas line or other lines. In an example process, the regeneration zone is disposed within a regeneration zone vessel, and the adsorption zone is disposed within an adsorption vessel that is separate from the vessel of the regeneration zone. The adsorption vessel can include, for example, a separate stack of modules that are shop fabricated. This allows improved quality control, and reduces or eliminates modification to existing equipment such as the regeneration zone.

Figure 3:
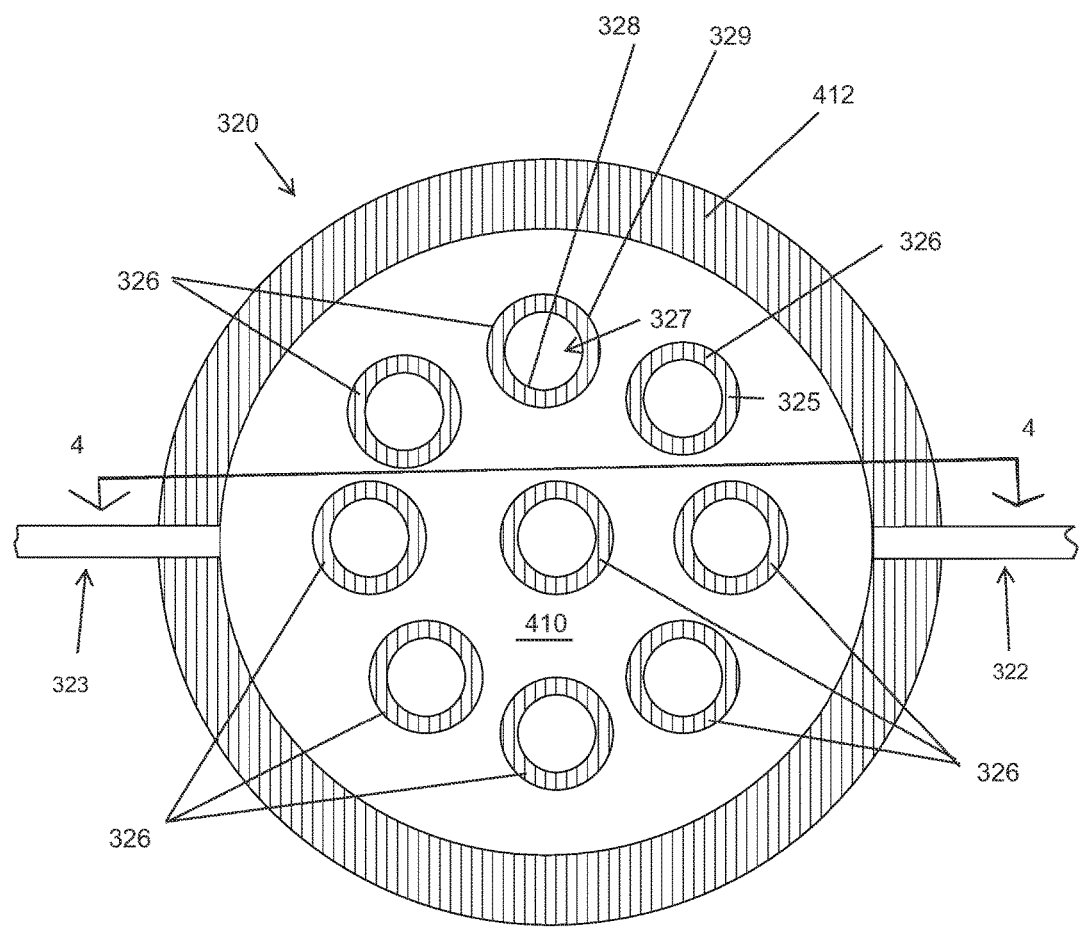
FIG. 3 is a cross-sectional view of one water removing zone of the arrangement of FIG. 1 taken along line 3-3 of FIG. 1.
Figure 4:
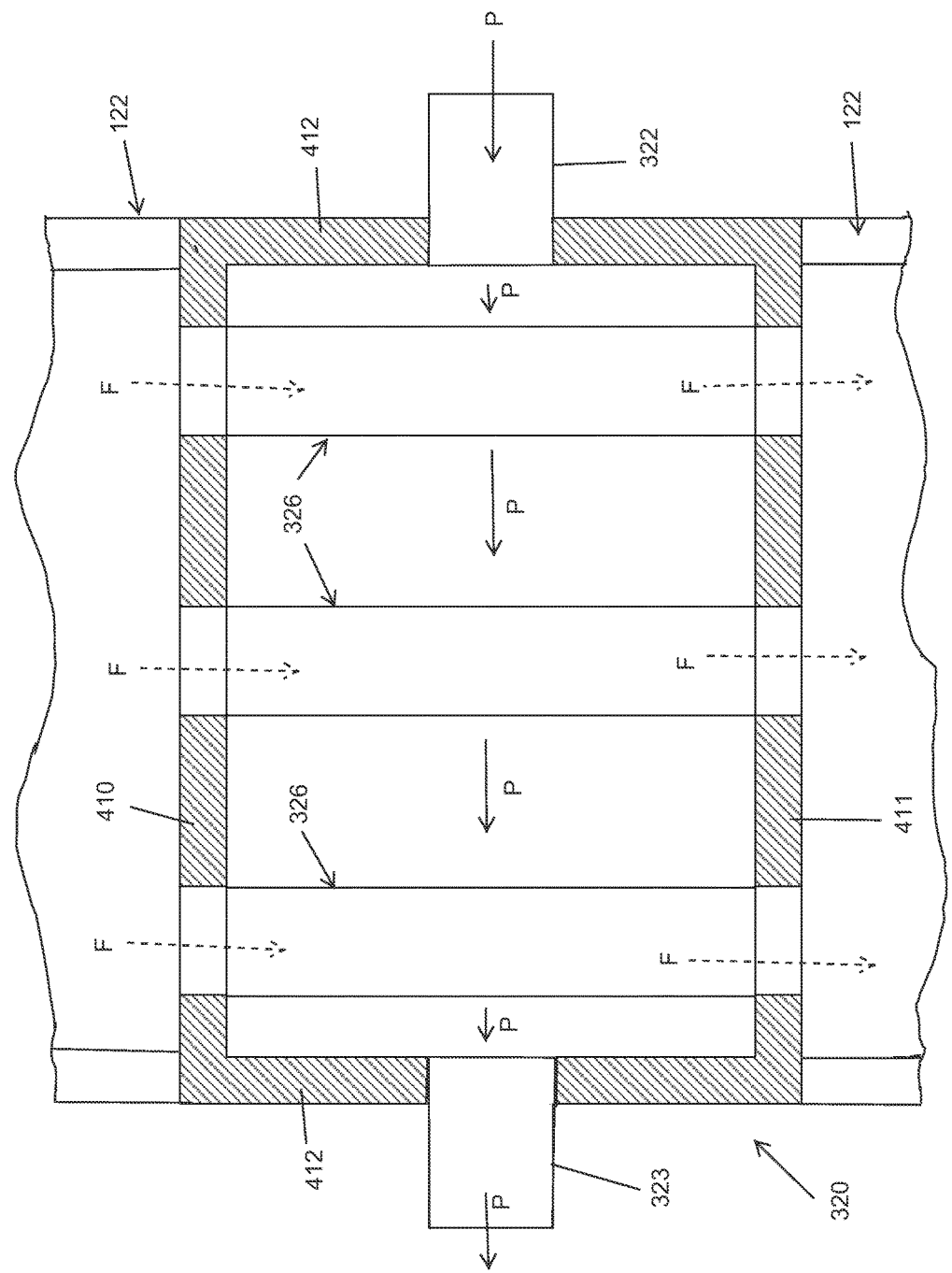
FIG. 4 is a cross-sectional view of the water removing zone of FIG. 3 taken along line 4-4 of FIG. 3.

Turning now to FIGS. 1, 3 and 4, the catalyst regeneration system 8 includes moisture removal zones 310, 320, 330, 340, and 350. The moisture removal zone 310 is located in line 96 in order to remove water from the recycle gas stream that is fed back into the coke combustion zone 50. The moisture removal zone 320 is located in line 122 in order to remove water from the vent gas stream that is fed into the adsorption/desorption zone 123. The moisture removal zone 330 is located in line 218 in order to remove water from the stream from the adsorption/desorption zone 123 that is fed back into the chlorination zone 60. The moisture removal zone 340 is located in line 232 in order to remove water from the makeup air that is supplied to the coke combustion zone 50. The moisture removal zone 350 is located in line 16 in order to remove water from the hydrogen that enters the reduction zone of the stacked reactor arrangement 22.

Referring now to FIGS. 3 and 4, the moisture removal zone 320 is shown in greater detail. The moisture removal zone 320 includes a housing formed by opposed spaced apart transverse walls 410 and 411 that extend between a cylindrical outer wall 412. Cylindrical tubes 326 extend between the walls 410 and 411. The tubes 326 each include a hollow interior space 327 defined by an inner surface 328. The tubes 326 also include an outer surface 329. Any number of tubes 326 can be arranged between the walls 410 and 411. Process fluid F from line 122 flows through the interior space 327 of each tube 326 as shown in FIG. 4.

The wall 325 of each of the cylindrical tubes 326 comprises a material that is selectively permeable to water. In one non-limiting example, the material of the walls 325 of each of the cylindrical tubes 326 removes gases based on their chemical affinity for sulfonic acid groups. Sulfonic acid groups have a very high affinity for water, so sulfonic acid groups absorb water from the process fluid F into the wall material at the inner surface 328 of each wall 325. Once absorbed into the wall 325, the water permeates from the inner surface 327, one sulfonic group to another until the water reaches the outside surface 329 of the tubes 326, where it evaporates into the surrounding gas in the housing formed by the transverse walls 410 and 411 and the cylindrical outer wall 412.

If the gases inside the tubes 326 contain more water (have a higher water vapor pressure) than the gases outside the tubes 326, the water vapor will move out of the tubes 326. If the gases outside of the tubes 326 contain more water, water vapor will move in. Therefore, a hot dry purge gas flow P (see FIG. 4) is moved over the tubes 326 to remove water from the interior space of the housing. The dry purge gas flow P is a heated, dry air stream from heater 238 that passes through lines 306, 308 and into line 322. After passing through the interior space of the housing and removing water, the purge gas is vented through line 323. Suitable valves may be provided in lines 322 and 323 to control purge gas pressure levels.

In one non-limiting example embodiment, the water removing material of the walls 325 of each of the cylindrical tubes 326 comprises a polymeric backbone with sulfonic acid groups. Preferably, the water removing material comprises a fluorocarbon having sulfonic acid groups. Most preferably, the water removing material comprises tetrafluoroethylene-perfluoro-3,6-dioxa-4-methyl-7-octenesulfonic acid copolymer, which is sold under the trademark Nafion®. The water removing material of the walls 325 of each of the cylindrical tubes 326 acts as a semi-permeable membrane that allows water molecules to pass through the material but other molecules are retained in the process fluid stream in line 122.

The other moisture removal zones 310, 330, 340, and 350 can be of a similar construction to the moisture removal zone 320 and therefore, the moisture removal zones 310, 330, 340, and 350 will not be described in further detail. Looking at FIG. 1, the moisture removal zone 310 receives dry purge gas flow P as a heated, dry air stream from heater 238 that passes through lines 306, 308 and into line 312. After passing through the interior space of the housing of the moisture removal zone 310, the purge gas is vented through line 313. Likewise, the moisture removal zone 330 receives dry purge gas flow P as a heated, dry air stream from heater 238 that passes through lines 306, 308 and into line 332. After passing through the interior space of the housing of the moisture removal zone 330, the purge gas is vented through line 333. Likewise, the moisture removal zone 340 receives dry purge gas flow P as a heated, dry air stream from heater 238 that passes through line 306 and into line 342. After passing through the interior space of the housing of the moisture removal zone 340, the purge gas is vented through line 343. Likewise, the moisture removal zone 350 receives dry purge gas flow P as a heated, dry air stream from heater 238 that passes through line 306 and into line 352. After passing through the interior space of the housing of the moisture removal zone 350, the purge gas is vented through line 353.

Reducing the moisture in the process flow streams of the catalyst regeneration system 8 using any combination of one, two, three, four, or five of the moisture removal zones 310, 320, 330, 340, 350 improves the reduction of the catalyst and reduces the build up of moisture in the burn zone of the catalyst regenerator, thereby improving yields.

In another embodiment, the material that is selectively permeable to water may be used in form of beads. For example, the water removing material that comprises tetrafluoroethylene-perfluoro-3,6-dioxa-4-methyl-7-octenesulfonic acid copolymer, which is sold under the trademark Nafion® may be in the form of beads. The beads may be housed in one or more vessels, and in one embodiment the beads are housed into dual vessels with one vessel in active drying mode while the other vessel is being regenerated. When the water uptake capacity of the beads in the vessel in active drying mode has been reached, or before capacity has been reached, the vessel is switched to the regeneration mode, and the vessel that had been in regeneration mode is switched to active drying mode. The beads may be regenerated by drying with a hot dry gas stream such as hot dry air or hot dry nitrogen. For regeneration, the hot drying gas may be passed over the beads in an up-flow or in a down-flow mode. Regenerant may be flushed from the vessel before being placed in service. An advantage of this embodiment is a continuous dry stream recycled to the continuous catalyst regeneration system without significant swings in flow rate. The moisture removal zones having moisture removal material in bead form may be located in any of the locations described above. Combinations of moisture removal zones in membrane form, bead form, and tubular form may be employed. It is also envisioned that a moisture removal zone may be located prior to the adsorption zone.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A process for regenerating catalyst comprising halogens as promoters, the process comprising:
   a) regenerating the catalyst in a regeneration zone by
   i—removing coke deposit on the catalyst in a combustion zone and
   ii—chlorinating the catalyst to replenish halogen catalytic promoters on the catalyst in a chlorination zone after the step of removing coke deposit;
   to obtain a regeneration zone effluent comprising halogen
   b) contacting a first portion of the regeneration zone effluent with adsorbent in an adsorption zone to remove halogen from the first portion of the regeneration zone effluent; desorbing halogen from the adsorbent to generate an adsorption zone effluent comprising the desorbed halogen; withdrawing from the adsorption zone the adsorption zone effluent comprising the desorbed halogen;
   c) contacting the adsorption zone effluent comprising desorbed halogen with a water removing material to create a first water-depleted stream comprising desorbed halogen; and
   d) passing at least a portion of the first water-depleted stream to the chlorination zone of step a).

2. The process of claim 1 wherein step (c) further comprises:
   contacting the first portion of the regeneration zone effluent with a second water removing material before contacting the first portion of the regeneration zone effluent with adsorbent in the adsorption zone.

3. The process of claim 1 wherein the water removing material comprises a membrane selectively permeable to water.

4. The process of claim 1 wherein feed flow of the adsorption zone effluent is tangential to a surface of the water removing material.

5. The process of claim 1 wherein the water removing material comprises a fluorocarbon having sulfonic acid groups.

6. The process of claim 1 wherein the water removing material comprises tetrafluoroethylene-perfluoro-3,6-dioxa-4-methyl-7-octenesulfonic acid copolymer.

7. The process of claim 1 wherein the water removing material is in a membrane form, a tubular form, or a bead form.

8. The process of claim 1 wherein the water removing material is in a bead form and the beads are housed in two vessels.

9. The process of claim 8 wherein a first vessel is in active drying mode and a second vessel is in regeneration mode.

10. The process of claim 9 wherein after a period of time the first vessel is adjusted to operate in regeneration mode and the second vessel is adjusted to operate in active drying mode.

11. The process of claim 1 wherein the water removing material is regenerated through contact with a hot dry gas.

12. The process of claim 1 wherein the adsorption zone is spaced apart from the regeneration zone.

* * * * *